United States Patent
Cole et al.

(10) Patent No.: US 9,657,628 B1
(45) Date of Patent: May 23, 2017

(54) REDUCTANT SUPPLY SYSTEM FOR ENGINE

(71) Applicant: Caterpillar Inc., Peoria, IL (US)

(72) Inventors: Brian Cole, Peoria, IL (US); Kevin L Dea, Morton, IL (US); Johnathan Trundt, Peoria, IL (US); Dirk DeDecker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/009,875

(22) Filed: Jan. 29, 2016

(51) Int. Cl.
F01N 3/00 (2006.01)
F01N 3/20 (2006.01)

(52) U.S. Cl.
CPC ...... *F01N 3/208* (2013.01); *F01N 2610/1486* (2013.01)

(58) Field of Classification Search
CPC ............. F01N 3/208; F01N 2610/1486; F01N 2610/1493
See application file for complete search history.

(56) References Cited

U.S. PATENT DOCUMENTS

| 7,017,335 | B2 | 3/2006 | Huber et al. |
| 8,006,482 | B2 | 8/2011 | Cox et al. |
| 8,293,180 | B2 * | 10/2012 | Matsunaga ........ B01D 53/9431 123/679 |
| 8,459,012 | B2 | 6/2013 | Sun et al. |
| 2008/0089384 | A1 * | 4/2008 | Nishina ............. B01D 53/9431 374/54 |
| 2012/0036838 | A1 | 2/2012 | Furuya |
| 2012/0324866 | A1 | 12/2012 | Hodgson et al. |
| 2013/0133309 | A1 * | 5/2013 | Zimmerman ......... F02D 41/222 60/274 |
| 2014/0331650 | A1 * | 11/2014 | Yang ...................... F01N 11/00 60/277 |
| 2015/0068196 | A1 * | 3/2015 | Kowalkowski .... B01D 53/9431 60/286 |
| 2016/0040575 | A1 * | 2/2016 | Zhang ..................... F01N 3/208 60/274 |

FOREIGN PATENT DOCUMENTS

| DE | 102009009711 | 8/2010 |
| FR | 2981689 | 4/2013 |
| FR | 2989418 | 10/2013 |

\* cited by examiner

*Primary Examiner* — Jesse Bogue

(57) ABSTRACT

A method for purging a reductant supply system for an engine is provided. The reductant supply system includes a reservoir to store a reductant. The reductant supply system further includes an injector to inject reductant in an exhaust conduit of the engine. The reductant supply system also includes a conduit coupled between the reservoir and the injector to supply the reductant. The method for purging the reductant supply system includes initiating purging of the injector and the conduit such that the reductant in the injector and conduit flows to the reservoir. The method further includes monitoring of the dilution of the reductant during purging and indicating a completion of the purging when the dilution of the reductant in the reservoir reaches a threshold value.

20 Claims, 3 Drawing Sheets

REDUCTANT SUPPLY SYSTEM FOR ENGINE

TECHNICAL FIELD

The present disclosure relates to the field of an engine. In particular, the present disclosure relates to a reductant supply system for the engine.

BACKGROUND

Engines, including diesel engines, gasoline engines, gaseous fuel powered engines, and other engines known in the art, exhaust a complex mixture of air pollutants. These air pollutants may be composed of gaseous compounds such as, for example, the oxides of nitrogen (NOx).

To reduce NOx content in the exhaust gas discharged to atmosphere, a NOx reduction system is utilized. In a conventional NOx reduction system, a reducing agent is introduced into the exhaust gas stream in the presence of a catalyst to remove NOx compounds from the exhaust gases. Some examples of reducing agents for reducing NOx compounds include ammonia, certain ammonium compounds, or urea.

The reducing agent may be introduced into the exhaust gas by an injector of a distribution system. The injector receives the reducing agent from a storage tank via a supply line. When the engine is shutdown, some of the reducing agent may freeze in various components such as the injector, the supply line, etc. of the distribution system. The freezing of the reducing agent may cause bulging or even rupture of the supply conduit. Further, due to frozen reducing agent, the injector may not efficiently deliver the reducing agent to the exhaust gas when the engine is operated again, which is not desirable.

One way of preventing the freezing of the reducing agent in various components of the distribution system is to purge the reducing agent from the injector, the supply line and any other component of the distribution system when the engine is shutdown. The distribution system may operate a pump for performing the purge. As the purge duration depends on the length of the supply line, the purge duration may be different for different engines or engine applications. Therefore, engines may have different purge calibrations for performing effective purging of the distribution system.

Alternatively, there may be a single purge calibration for all engines or engine applications. The single purge calibration may be developed based on the engine having the longest length of the supply line. Thereby, the purging for all engines is performed for the maximum time duration equivalent to the engine having the longest length of the supply line. This may cause excess idle time for the engine and/or machine, and its operator, which is not desirable. Further, the pump may operate even after complete removal of the reducing agent from the distribution system. In this scenario, cavitation may occur, thereby reducing life of the pump.

FR Patent No. 2,981,689 discloses a method and system for injecting liquid reagent into exhaust line of an engine for reducing oxides of nitrogen in the exhaust gas. The patent further describes method for purging the system of injecting liquid reagent. The method discloses determining completion of the purge event based on a pressure value in a liquid reagent supply line.

SUMMARY OF THE INVENTION

According to one aspect of the disclosure, a method for purging a reductant supply system for an engine is disclosed. The reductant supply system includes a reservoir to store a reductant. The reductant supply system further includes an injector to inject reductant into an exhaust conduit of the engine. The reductant supply system also includes a conduit coupled between the reservoir and the injector to supply the reductant. The method for purging the reductant supply system includes initiating purging of the injector and the conduit such that the reductant in the injector and conduit flows to the reservoir. The method further includes monitoring of the dilution of the reductant during purging and indicating a completion of the purging when the dilution of the reductant in the reservoir reaches a threshold value.

According to another aspect, a reductant supply system for an engine is disclosed. The reductant supply system is configured to supply a reductant to an exhaust conduit of the engine. The reductant supply system includes a reservoir to store the reductant, an injector, a conduit, a sensor, and a controller. The injector is disposed in the exhaust conduit and configured to inject the reductant into the exhaust conduit. Further, the conduit is coupled between the injector and the reservoir. The conduit facilitates flow of the reductant between the reservoir and the injector. Also, the sensor is arranged to monitor dilution of the reductant. Further, the controller is in communication with the sensor and configured to initiate a purge of the injector and the conduit such that the reductant being purged is returned to the reservoir. The controller is also configured to monitor the dilution of the reductant present in the reservoir, via the sensor, during the purge. Furthermore, the controller is configured to indicate a completion of the purge when the dilution of the reductant in the reservoir reaches a threshold value.

According to yet another aspect, an engine is disclosed. The engine includes a reservoir to store the reductant, an injector, a conduit, a sensor, and a controller. The injector is disposed in an exhaust conduit and configured to inject the reductant into the exhaust conduit. Further, the conduit is coupled between the injector and the reservoir. The conduit facilitates flow of the reductant between the reservoir and the injector. Also, the sensor is arranged to monitor dilution of the reductant. Further, the controller is in communication with the sensor and configured to initiate a purge of the injector and the conduit such that the reductant being purged is returned to the reservoir. The controller is also configured to monitor the dilution of the reductant present in the reservoir, via the sensor, during the purge. Furthermore, the controller is configured to indicate a completion of the purge when the dilution of the reductant in the reservoir reaches a threshold value.

DETAILED DESCRIPTION

Figure 1:
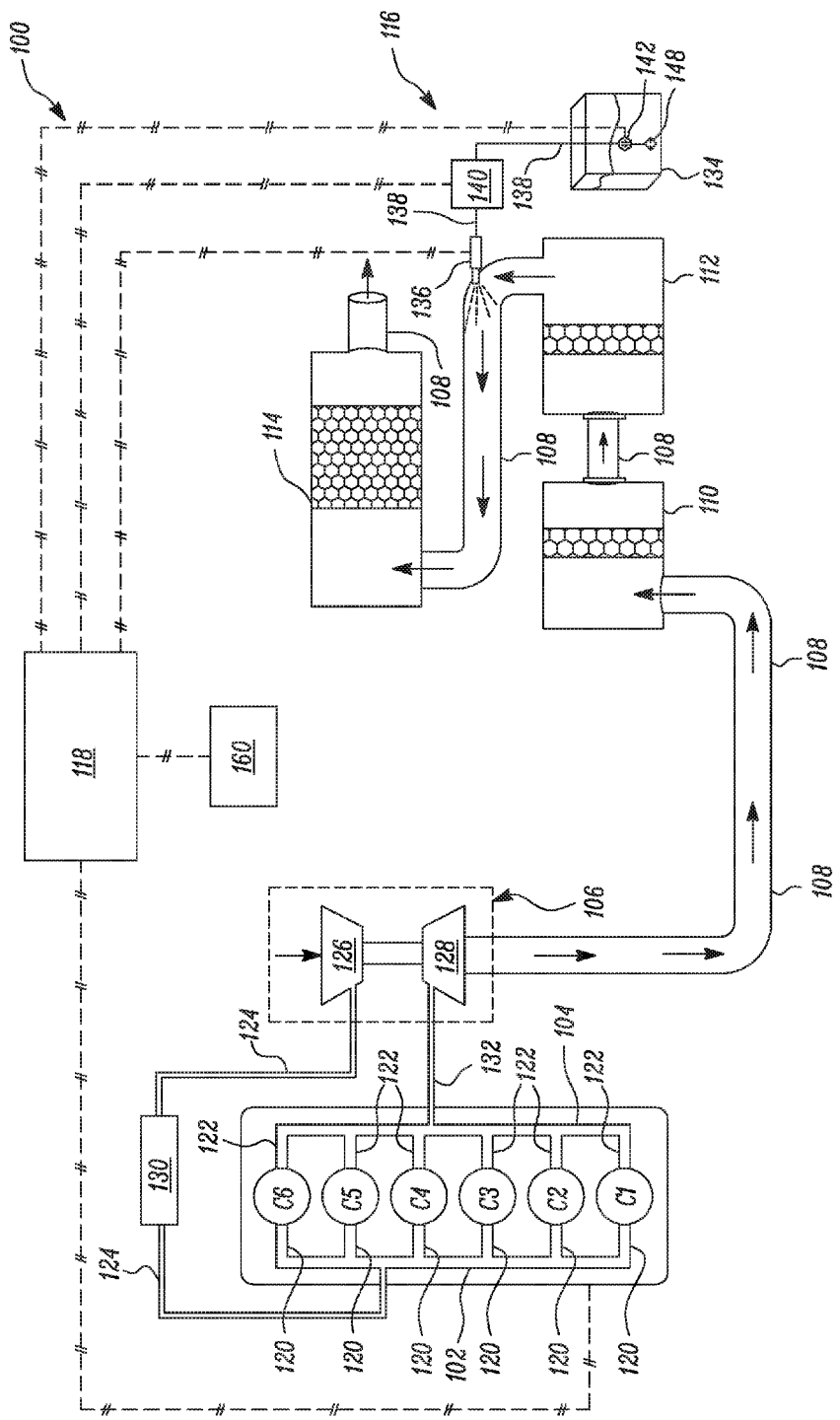
FIG. 1 illustrates an engine in accordance with an embodiment.

Referring to FIG. 1, there is shown an embodiment of an engine 100. The engine 100 may be a gasoline engine, a gaseous engine, a diesel engine or a dual fuel engine. The gaseous engine may use natural gas, propane gas, methane gas or any other gaseous fuel suitable for use in the gaseous engine. The engine may be a single cylinder or a multi cylinder engine. Further, the engine 100 may be a two stroke engine, a four stroke engine, or a six stroke engine. Also, the engine 100 may be a spark ignited engine, a compression ignition engine, a distributed ignition engine or a homogeneous charge compression ignition engine.

As shown in FIG. 1, the engine 100 may include an intake manifold 102, an exhaust manifold 104, a turbocharger 106, an exhaust conduit 108, a diesel oxidation catalyst system 110, a diesel particulate filter 112, a selective catalytic reduction system (SCR) 114, a reductant supply system 116, and a controller 118. The intake manifold 102 and the exhaust manifold 104 are each fluidly coupled with a plurality of combustion cylinders C1 through C6, as indicated schematically by lines 120 and 122, respectively. In the embodiment shown, a single intake manifold 102 and exhaust manifold 104 are fluidly coupled with combustion cylinders C1 through C6. However, it is also possible to configure the intake manifold 102 and/or the exhaust manifold 104 as a split or multiple-piece manifold, each associated with a different group of combustion cylinders.

The turbocharger 106 may be configured to provide air to the combustion cylinders C1 to C6 via an intake conduit 124. The turbocharger 106 includes a compressor 126 and a turbine 128. The compressor 126 is driven by the turbine 128 to compress the air and deliver the compressed air to the combustion cylinders C1 to C6 via the intake conduit 124. A heat exchanger 130 may be positioned in the intake conduit 124 between the compressor 126 and the intake manifold 102. The heat exchanger 130 is configured to cool the compressed air coming from the compressor 126 and thereby delivers cool air to the combustion cylinders C1 to C6. The turbine 126 is driven by exhaust gas discharged from the combustion cylinders C1 to C6. The exhaust gas is delivered to the turbine 126 from the exhaust manifold 104 via a line 132. The turbine 128 may discharge the exhaust gas to the exhaust conduit 108.

The diesel oxidation catalyst 110 may be positioned in the exhaust conduit 108 downstream of the turbine 128. The diesel oxidation catalyst 110 may remove harmful constituents present in the exhaust gas. In an embodiment, the diesel oxidation catalyst 110 oxidizes the unburned hydrocarbon present in the exhaust gas. Exhaust gas coming out of the diesel oxidation catalyst may enter the diesel particulate filter 112.

The diesel particulate filter 112 may be positioned in the exhaust conduit 108 downstream of the diesel oxidation catalyst 110. The diesel particulate filter 112 filters the soot or any particulate matter present in the exhaust gas. Although the diesel particulate filter 112 is contemplated, any other filter such as gasoline particulate filter suitable for use with a particular engine may also be positioned in the exhaust conduit 108. Also, an exhaust system without any particulate filter may also be contemplated and covered within the scope of the disclosure. Furthermore, the SCR 114 may be positioned in the exhaust conduit 108 downstream of the diesel particulate filter 112.

In an embodiment, only the SCR 114 may be positioned in the exhaust conduit downstream of the turbine 128. The SCR 114 is configured to reduce oxides of nitrogen (NOx) present in the exhaust gas. The SCR 114 includes a catalyst that reduces the NOx into nitrogen and water in the presence of a reductant. Hereinafter the reductant is referred as diesel exhaust fluid (DEF). The diesel exhaust fluid may be injected into the exhaust gas before the exhaust gas enters into the SCR 114. The reductant supply system 116 may inject the diesel exhaust fluid into the exhaust conduit 108 upstream of the SCR 114. The diesel exhaust fluid may be a urea containing fluid, an ammonia containing fluid or any other suitable fluid which can reduce oxides of nitrogen present in the exhaust gas into nitrogen and water in the presence of a suitable catalyst.

Figure 2:
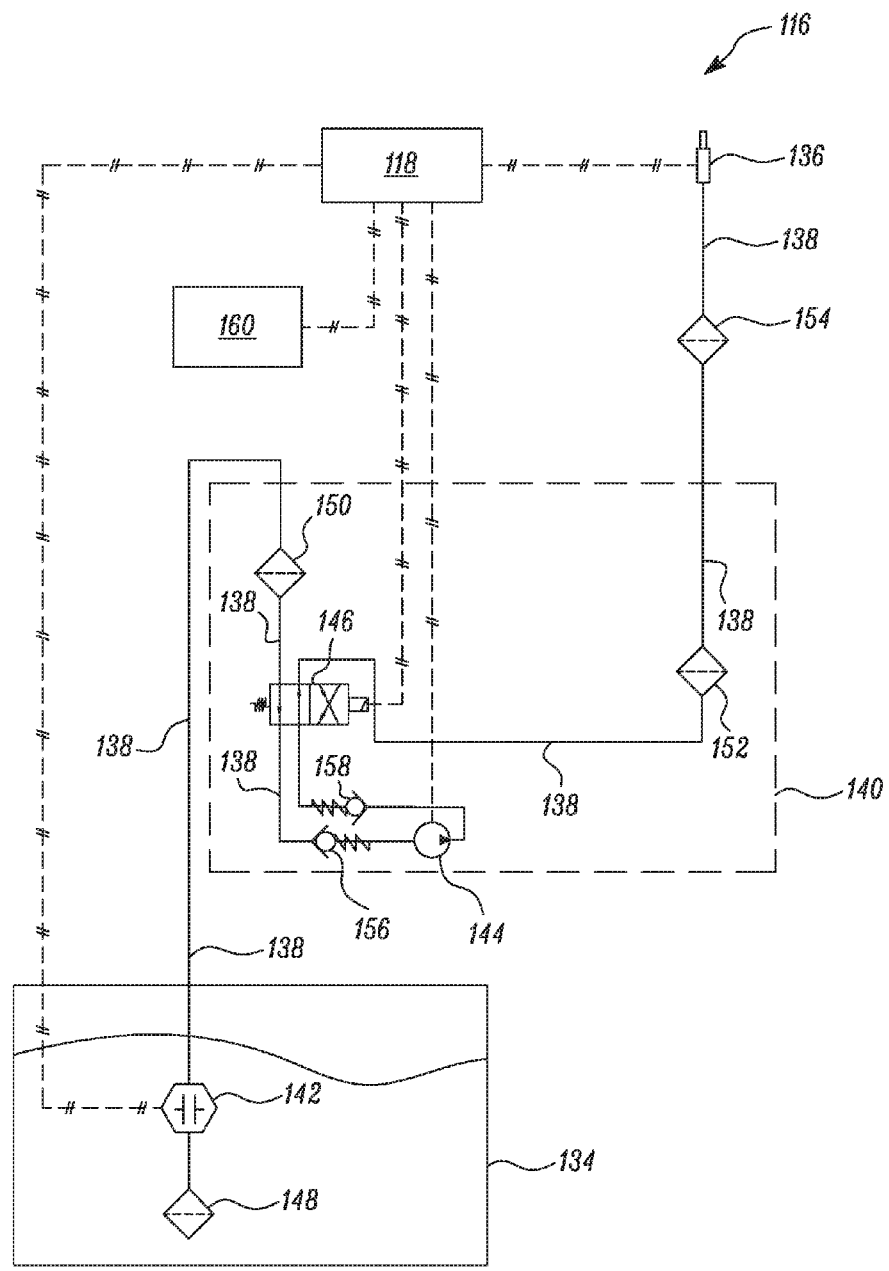
FIG. 2 illustrates a reductant supply system for the engine in accordance with an embodiment.

As shown in FIG. 1 and FIG. 2, the reductant supply system 116 includes a reservoir 134, an injector 136, a conduit 138, an actuation system 140, and a sensor 142. The actuation system 140 includes a pump 144 and a valve 146. The reductant supply system 116 is configured to supply DEF to the exhaust conduit 108 when the engine 100 is in an operating state. The engine operating state refers to a state when engine 100 is generating power by way of combustion of fuel in one or more of the combustion cylinders C1 to C6. The DEF may be supplied to the exhaust conduit 108 from the reservoir 134.

The reservoir 134 stores the diesel exhaust fluid (DEF) and may be mounted on a machine (not shown). The reservoir 134 may include an inlet (not shown) through which DEF may be filled into the reservoir 134 from an external source. The reservoir 134 may include various other components such as a drain opening, breather opening, etc. as known in the art. The reservoir 134 may be connected to the conduit 138. The conduit 138 fluidly couples the reservoir 134 to the injector 136. The conduit 138 facilitates flow of DEF between the reservoir 134 and the injector 136.

In the operating state of the engine 100, the conduit 138 facilitates supply of DEF from the reservoir 134 to the injector 136. Further, during purging of the reductant supply system 116, the conduit 138 may facilitate flow of the DEF from the injector 136 to the reservoir 134. In an embodiment, the purging of the injector 136 and the conduit 138 may be initiated during a shutdown state of the engine 100. In such case, the purging may be initiated automatically upon detection of the shutdown state of the engine 100 or may be initiated manually by an operator during the shutdown state of the engine 100. In another embodiment, the purging may be initiated on an operator's command during the operating state of the engine 100. The shutdown state of the engine 100 may refer to an engine state in which fuel to the combustion cylinders C1 to C6 is cut-off and the engine 100 is not generating power. Further, during the shutdown state of the engine 100, electric power from a battery may be supplied to various electrical components of the engine 100. The shutdown of the engine 100 may be initiated by an operator. During the shutdown state of the engine 100, the battery may be connected to the pump 144, to allow for operation of the pump 144.

Pump 144 may be disposed downstream of the reservoir 134 and coupled to the conduit 138. The pump 144 may be a hydraulic pump, a pneumatic pump, an electric pump or any other pump known in the art. A filter 148 may be positioned at an opening of the conduit 138 in the reservoir 134 to remove any impurities in the DEF entering the conduit 138. The filter 148 may be a tank header filter. Although a tank header filter is contemplated, any other type of filter known in the art would also apply.

The pump 144 may pump the DEF from the reservoir 134 to the injector 136 during the operating state of the engine 100. Further, the pump 144 may pump the DEF from the injector 136 to the reservoir 134 via the conduit 138 during purging. Purging refers to the removal of DEF present in the injector 134 and the conduit 138. The purging is performed to prevent freezing of DEF in the injector 134, the conduit 138 or any other component of the reductant supply system 116.

The pump 144 may be a variable displacement pump. The displacement of the pump 144 may be controlled to vary the amount of DEF delivered to the injector 136. The displacement of the pump 144 may be controlled or adjusted based on one or more engine parameters, such as, but not limited to, the amount of exhaust gas discharged from the combustion cylinders C1 to C6, the amount of NOx present in exhaust gas, power output of the engine 100, etc. In an embodiment (as shown in FIG. 2), the pump 144 may be a fixed displacement pump. In the reductant supply system 116 having the fixed displacement pump, the amount of DEF to the injector 136 may be controlled by a metering valve or some other mechanism known in the art.

Further, the pump 144 may be a bidirectional pump. In one direction of rotation, the pump 144 may supply DEF from the reservoir 134 to the injector 136, and in the other direction of rotation, the pump 144 purges the DEF from the injector 136 and the conduit 138 to the reservoir 134. In the illustrated embodiment, the pump 144 is a unidirectional pump. The direction of flow of the DEF through the conduit 138 between the injector 136 and the reservoir 134 is controlled by controlling a position of the valve 146.

The valve 146 is coupled to the conduit 138 and positioned downstream of the reservoir 134. The valve 146 may control the amount of flow of the DEF to the injector 136. The valve 146 may be solenoid actuated valve. Although a solenoid actuated valve is envisioned, other types of valves such as but not limited to a hydraulically actuated valve, a mechanically actuated valve, a pilot pressure operated valve, or a pneumatically actuated valve may also be considered.

As shown in FIG. 2, the valve 146 is a four port two position valve. In a first position, the valve 146 fluidly connects the injector 136 and the reservoir 134 such that DEF flows from the reservoir 134 to the injector 136 via the conduit 138. The valve 146 is actuated in the first position when the engine 100 is in the operating state. In a second position, the valve 146 fluidly connects the injector 136 and the reservoir 134 such that DEF flows from the injector 134 and the conduit 138 to the reservoir 134. The valve 146 is actuated in the second position when purge of the injector 136 and the conduit 138 is initiated for purging the DEF. Although a 4 port 2 position valve is contemplated, any other suitable valve such as but not limited to a 2 port 2 position valve may also be envisioned. For example, in an embodiment when the pump 144 is the bi-directional pump, a 2 port 2 position valve may be utilized. In one position of the valve 146, the valve 146 fluidly couples the injector 136 and the reservoir 134. By changing the direction of rotation of the pump 144, the DEF may be supplied to the reservoir 134 from the injector 136 and the conduit 138. In another position of the valve 146, the valve 146 may fluidly disconnect the injector 136 from the reservoir 134 thereby preventing any flow of DEF between the injector 136 and the reservoir 134. Further, in an embodiment, when the pump 144 is a bi-directional variable displacement pump the valve 146 may be omitted.

Referring to FIG. 2, the sensor 142 may be positioned inside the reservoir 134 at a location in proximity to the opening of the conduit 138 in the reservoir 134. In an embodiment, the sensor 142 may be mounted at the bottom or any of the walls of the reservoir 134 in proximity to the opening of the conduit 138 in the reservoir 134. In an embodiment, the sensor 142 may be mounted to an end of the conduit 138 submerged in the reservoir 134. In an embodiment, the sensor 142 may be positioned inside the conduit 138 into proximity to the filter 148. The sensor 142 may monitor dilution of the DEF present in the reservoir 134. In an embodiment, the sensor 142 is an optical sensor, such as, e.g., a near infrared sensor, which uses refraction of light to detect air bubbles exiting or inside the conduit 138 for monitoring dilution of DEF in the reservoir 134. In an embodiment, the sensor 142 monitors presence of air bubbles in the reservoir 134 to monitor the dilution of DEF in the reservoir 134. In an embodiment, during purge, the sensor 142 may generate a signal that correlates to a content of air bubbles in the DEF. The determined content of air bubbles may be compared to an air bubble content threshold value to determine and indicate a completion of the purge. Although the near infrared sensor is contemplated as the sensor 142, any other type of sensor such as a viscosity sensor, a conductivity sensor, a tuning fork, an ultrasonic conductivity sensor or any other sensor suitable for monitoring dilution of DEF known in the art would also apply. Further, in an embodiment, the sensor 142 may be positioned at an outlet of the pump 144 or any other location along the conduit 138 such as inlet of the pump 144 to monitor presence of air bubbles or air at the outlet of the pump 144.

In one embodiment, the sensor 142 may also monitor the quality of DEF. The quality of the DEF may refer to an aging, a viscosity, a pH level or any other known parameter associated with the quality of DEF. During non-purge, the sensor 142 may generate a signal corresponding to the quality of DEF. The quality level corresponding to the signal may be compared to a quality threshold to determine and indicate a deterioration of or a change in quality of DEF present in the reductant supply system 116. Although a single sensor 142 is contemplated for monitoring the quality of DEF during non-purge and the dilution of DEF or air bubbles during purge, the reductant supply system 116 may have independent sensors for monitoring each of these parameters.

The sensor 142 is in communication with the controller 118. The sensor 142 may communicate presence of air bubbles in the reservoir 134 or any other parameter associated with the dilution of the DEF to the controller 118. The controller 118 may include a non-transient computer readable storage media (not shown) including code, engine operating maps, operating parameters for enabling monitoring and controlling of the engine 100, DEF dilution maps or tables or parameters for determining dilution of the DEF and controlling of the reductant supply system 116. The controller 118 may be configured to receive signals from a variety of engine sensors, including sensor 142, in order to determine operating parameters and operating states, and correspondingly control operation of the engine 100 and the reductant supply system 116.

In an exemplary embodiment, the controller 118 may receive signals from various engine sensors including, but not limited to, engine speed, engine load, intake manifold air pressure, exhaust gas pressure, ambient air pressure, exhaust gas temperature etc. Correspondingly, the controller 118 may send a signal to a solenoid to actuate the valve 146 in the second position for initiating purging of the injector 136 and the conduit 138 when the engine 100 is in the shutdown state. Further, the controller 118 may receive a signal associated with dilution of the DEF in the reservoir 134 from the sensor 142. Correspondingly, the controller 118 may determine a completion of the purging when the dilution of the DEF in the reservoir 134 reaches a threshold value. In an embodiment, the controller 118 may determine a completion of the purging based on a momentary deviation of the dilution of DEF in the reservoir 134 during the purging. The momentary deviation of the dilution of the DEF in the reservoir 134 is due to the air bubbles entering in the reservoir 134 from the conduit 138. Further, the controller 118 indicates the completion of the purging to an operator of the engine 100 or to an operator of the machine in which engine 100 is mounted. In the embodiment in which sensor 142 is positioned at the outlet of the pump 144 or any other location such as inlet of the pump 144 along the conduit 138, the controller 118 may determine the completion of the purging after a predetermined duration of detection of air bubbles or dilution of DEF at the outlet of the pump 144. The predetermined duration is calculated based on the length of the conduit 138 between the reservoir 134 and the outlet of the pump 144 or any other location along the conduit 138 where the sensor 142 is located. Therefore, the controller 118 determines and indicates completion of purging when the dilution of the DEF in the reservoir 134 reaches a threshold value.

The controller 118 actuates an indicator 160 to indicate the completion of the purging to the operator. The indicator 160 may be an audio, a video, and/or tactile feedback device. In an embodiment, the controller 118 may indicate the completion of purging by switching on a lamp. In another embodiment, the controller 118 may indicate the completion of purging by actuating a horn. In an embodiment, the controller 118 may indicate the completion of the purging by actuating both the lamp and the horn.

In an embodiment, the controller 118 may switch off an electrical contact between the battery and the pump 144 after completion of the purging. This disconnects the battery from the pump 144 and thereby stops the operation of the reductant supply system 116. In an embodiment, the operator may disconnect the electrical contact after receiving the indication of completion of the purging of the injector 136 and the conduit 138.

Further, the reductant supply system 116 may include a plurality of filters 150-154 positioned at different locations to filter the contaminants from the DEF. As shown in FIG. 2, the filter 150 is positioned upstream of the pump 144. The filter 150 may be a coarse filter to remove large size contaminants from the DEF to prevent any large size particle going to the pump 144. Further, as shown in FIG. 2, the filter 152 is positioned downstream of the pump 144. The filter 152 may be fine filter to filter out small size contaminants from DEF to be delivered to the injector 136. Also, the filter 154 is disposed in the conduit 138 between the injector 136 and the filter 152.

Furthermore, as shown in FIG. 2, the reductant supply system 116 may include a first check valve 156 and a second check valve 158. The first check valve 156 may be positioned between the reservoir 134 and the pump 144. The first check valve 156 may prevent return flow of DEF sucked by the pump 144. The second check valve 158 is positioned in the conduit 138 downstream of the discharge side of the pump 144. The second check valve 158 prevents the flow of the DEF back to the pump 144.

INDUSTRIAL APPLICABILITY

The present disclosure provides for the reductant supply system 116 configured for introducing DEF to the exhaust conduit 108 during the operating state of the engine 100 for mixing with exhaust gas flowing through the exhaust conduit 108. The DEF mixed with the exhaust gas reacts with NOx present in the exhaust gas when passed through the SCR 114 and converts the NOx into nitrogen and water. During the shutdown state of the engine 100, purging of the reductant supply system 116 is performed to remove DEF present in the injector 136, the conduit 138 and any other component of the reductant supply system 116. The purging is performed to avoid freezing of the DEF inside the conduit 138, the injector 136 and any other component.

Figure 3:
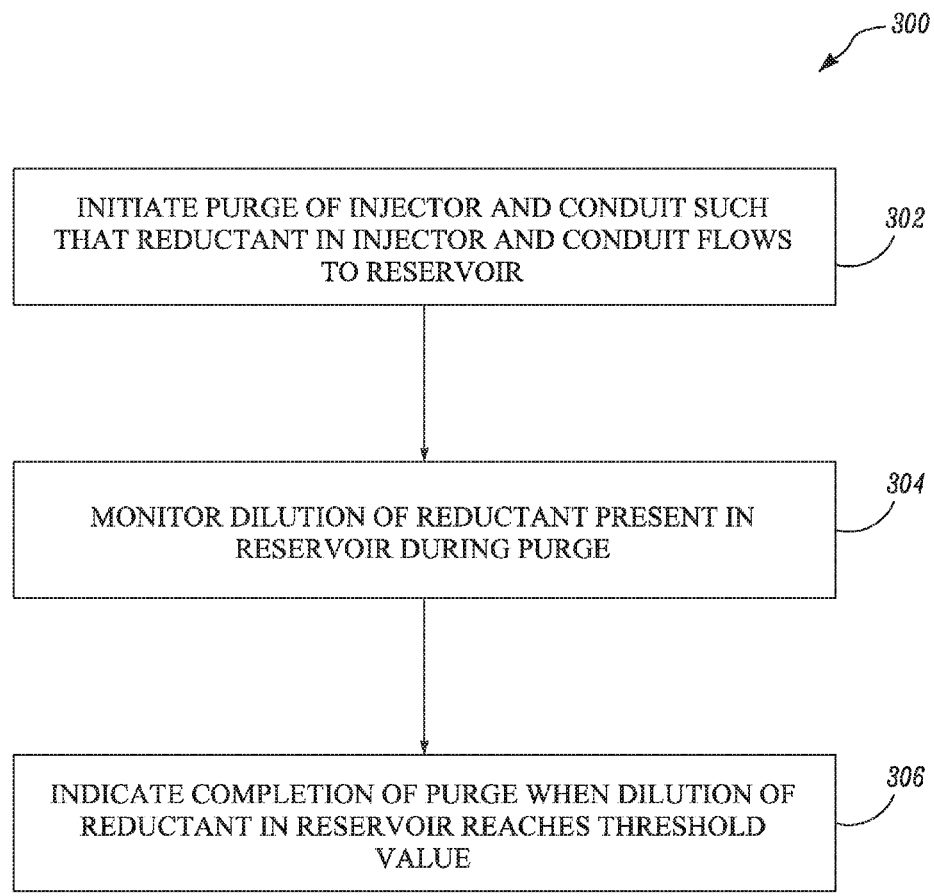
FIG. 3 illustrates a method for purging the reductant supply system in accordance with an embodiment.

Further, the present disclosure provides for a method 300 for purging the reductant supply system 116 for the engine 100 in accordance with an embodiment. Referring to FIG. 3, the method 300 includes a step 302 in which the purging of the injector 136 and the conduit 138 is initiated. In an embodiment, the purging of the injector 136 and the conduit 138 is initiated when the engine 100 is in the shutdown state. The controller 118 may determine the shutdown state of the engine 100 when the operator selects an engine shutdown feature in an operator interface. In an embodiment, the controller 118 may determine the shutdown state of the engine 100 when fuel injection in the combustion cylinders C1 to C6 is cut-off. In another embodiment, the controller 118 may determine the shutdown state of the engine 100 based on the intake manifold air pressure, exhaust gas pressure, pressure inside the combustion cylinders C1 to C6 or any other suitable parameter known in the art. In an embodiment, the purging of the injector 136 and the conduit 138 may be initiated based on an operator command during the operating state of the engine 100.

During purging, the DEF present in the injector 136, the conduit 138 and any other component of the reductant supply system 116 is returned to the reservoir 134. For purging, the controller 118 actuates the valve 146 in the second position, thereby the pump 144 directs the DEF present in the injector 136 and the conduit 138 to the reservoir 134.

The method 300 further includes a step 304 in which dilution of the DEF present in the reservoir 134 is monitored during purging. The dilution of the DEF is monitored by the sensor 142. In an embodiment, the sensor 142 is the near infrared sensor and the dilution of the DEF in the reservoir 134 is monitored by monitoring the presence of air bubbles in the reservoir 134 exiting the conduit 138.

Furthermore, the method 300 includes a step 306 in which completion of the purging is indicated when the dilution of the DEF in the reservoir 134 reaches a threshold value. The controller 118 determines the dilution of the DEF based on the signal received from the sensor 142. In another embodiment, the controller 118 may monitor the dilution of the DEF in the reservoir 134 for a predetermined period of time. The controller 118 may indicate the completion of the purging when the dilution of the DEF reaches the threshold value for a duration more than or equal to the predetermined time period. In an embodiment, completion of purging may be determined based on the emergence of air bubbles in the reservoir 134 from the conduit 138 for a predefined period of time.

The controller 118 indicates the completion of purging by actuating the indicator 160. The operator of the engine 100 or a machine fitted with the engine 100 shuts down the reductant supply system 116 by disconnecting the electrical supply to the pump 144. Further, in an embodiment, the controller 118 automatically stops the pump 144 and shuts down the reductant supply system 116 after completion of purging.

Purging of the reductant supply system 116 removes DEF present in the injector 136, the conduit 138 and any other component. This helps in avoiding freezing of the DEF inside the injector 136 and the conduit 138 thereby preventing bulging or rupturing of the conduit 138. Further, as the completion of purging is determined by the dilution of the DEF in the reservoir 134, the pump 144 is only operated for minimum required durations. This prevents the idling of the operator or the engine 100 or the machine and also prevents shutting down of the reductant supply system 116 before completion of purging. Further, quickly stopping of the pump 144 after removal of the DEF prevents cavitation, thereby increasing the overall life of the pump 144.

What is claimed is:

1. A method for purging a reductant supply system for an engine, the reductant supply system including a reservoir to store a reductant, an injector to inject the reductant in an exhaust conduit of the engine, and a conduit coupled between the reservoir and the injector to supply the reductant, the method comprising:
    initiating purging of the injector and the conduit such that the reductant in the injector and the conduit flows to the reservoir;
    monitoring a dilution of the reductant present in the reservoir during purging; and
    indicating a completion of purging when the dilution of the reductant in the reservoir reaches a threshold value.

2. The method of claim 1, wherein a controller indicates the completion of purging when the dilution of the reductant in the reservoir reaches the threshold value for a time duration more than a predetermined time period.

3. The method of claim 1, wherein indicating the completion of purging is performed by actuating an indicator.

4. The method of claim 1, wherein the dilution of the reductant in the reservoir is monitored by monitoring presence of air bubbles.

5. The method of claim 1, wherein a pump delivers the reductant from the injector and the reductant conduit to the reservoir during purging.

6. The method of claim 5, wherein the pump is automatically stopped after the completion of purging.

7. The method of claim 1, wherein monitoring of the dilution is performed by one of an optical sensor, an acoustic sensor, or a conductivity sensor.

8. A reductant supply system for an engine configured to supply a reductant to an exhaust conduit of the engine, the reductant supply system comprising:
    a reservoir to store the reductant;
    an injector disposed in the exhaust conduit and configured to inject the reductant in the exhaust conduit;
    a conduit coupled between the reservoir and the injector, the conduit facilitates flow of the reductant between the reservoir and the injector;
    a sensor arranged to monitor a dilution of the reductant;
    a controller in communication with the sensor, configured to:
        initiate a purge of the injector and the conduit such that the reductant being purged is returned to the reservoir;
        monitor the dilution of the reductant in the reservoir, via the sensor, during the purge; and
        indicate a completion of the purge when the dilution of the reductant in the reservoir reaches a threshold value.

9. The reductant supply system of claim 8, wherein the controller indicates the completion of the purge when dilution of the reductant in the reservoir reaches the threshold value for a time duration more than a predetermined time period.

10. The reductant supply system of claim 8, wherein an indicator is actuated to indicate the completion of the purge.

11. The reductant supply system of claim 8, wherein the reductant supply system includes a pump to deliver the reductant from the injector and the conduit to the reservoir during the purge.

12. The reductant supply system of claim 11, wherein the controller automatically stops the pump after the completion of the purge.

13. The reductant supply system of claim 8, wherein the sensor is one of an optical sensor, an acoustic sensor, or a conductivity sensor.

14. The reductant supply system of claim 8, wherein the sensor is configured to monitor presence of air bubbles to monitor the dilution of the reductant in the reservoir during the purge.

15. An engine comprising:
    a reservoir to store a reductant;
    an injector disposed in an exhaust conduit and configured to inject the reductant in the exhaust conduit;
    a conduit coupled between the reservoir and the injector, the conduit facilitates flow of the reductant between the injector and the reservoir;
    a sensor arranged to monitor a dilution of the reductant;
    a controller in communication with the sensor, configured to:
        initiate a purge of the injector and the conduit such that the reductant being purged is returned to the reservoir;
        monitor the dilution of the reductant in the reservoir, via the sensor, during the purge; and
        indicate a completion of the purge when the dilution of the reductant in the reservoir reaches a threshold value.

16. The engine of claim 15, wherein the controller indicates the completion of the purge when dilution of the reductant in the reservoir reaches the threshold value for a time duration more than a predetermined time period.

17. The engine of claim 15, wherein the engine includes a pump to deliver the reductant from the injector and the conduit to the reservoir during the purge.

18. The engine of claim 17, wherein the controller automatically stops the pump after the completion of the purge.

19. The engine of claim 15, wherein the sensor is one of an optical sensor, an acoustic sensor, or a conductivity sensor.

20. The engine of claim 15, wherein the sensor is configured to monitor presence of air bubbles to monitor the dilution of the reductant in the reservoir during the purge.

* * * * *